April 4, 1950   R. L. TICHENOR   2,503,179
BATTERY CHARGING METHOD
Filed Feb. 10, 1948
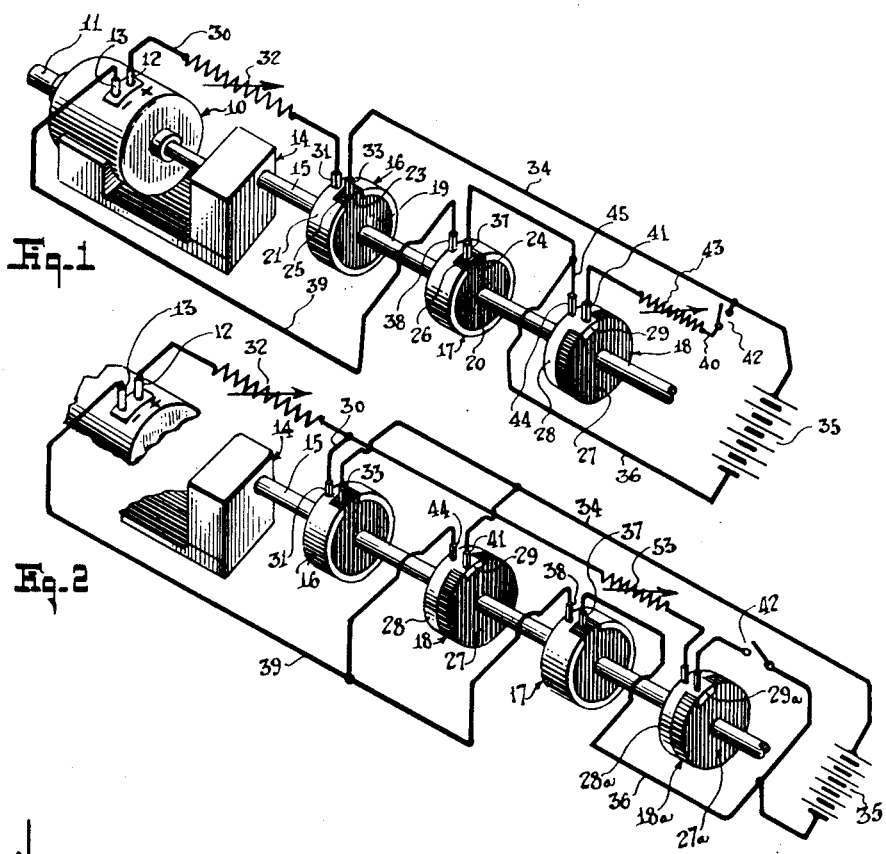
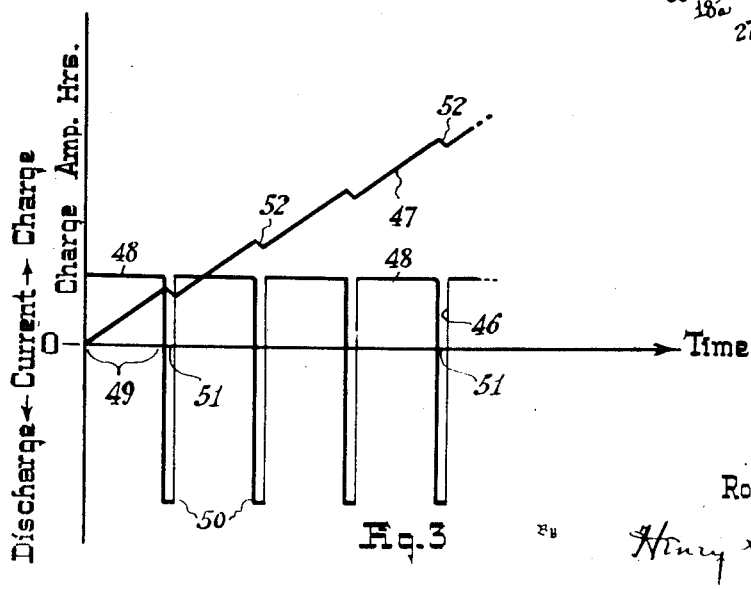
Inventor
Robert L. Tichenor
By Henry Lanahan
Attorney Patented Apr. 4, 1950

2,503,179

UNITED STATES PATENT OFFICE 2,503,179

BATTERY CHARGING METHOD

Robert L. Tichenor, East Orange, N. J., assignor to Thomas A. Edison, Incorporated, West Orange, N. J., a corporation of New Jersey Application February 10, 1948, Serial No. 7,477

5 Claims. (Cl. 320—14)

This invention relates to novel methods of and apparatus for charging batteries. The invention has beneficial results in connection with storage batteries as heretofore known, and is particularly meritorious in connection with batteries of the class having a negative electrode of an active material which reacts electrochemically with the electrolyte to form soluble compounds as the battery is discharged.

Particularly beneficial results of the invention as to batteries of the class mentioned are that it mitigates "treeing" at the negative electrodes during charging, permits reduction and even elimination of the usual separators between electrodes, provides denser and more even deposition of the active materials on the electrodes and enables batteries of this class heretofore considered only as primary batteries to be successfully reversed and used as storage batteries.

In the present specification the term "soluble," as applied to the reaction products of the active negative-electrode material with the electrolyte, is used to mean that these products will dissolve at least to a substantial extent in the electrolyte and can be deposited from the resulting solutions by electrolysis and with fair current efficiency. Batteries of this class are well known but have heretofore been generally considered only as primary batteries since it has been the general understanding by those skilled in the battery art that a storage battery cannot use active electrode materials which during discharge of the battery form reaction products that are soluble in the electrolye. However, it has long been known that superior results in the storage battery art might be obtained if the action of batteries of this class could be successfully reversed, and attempts have been made to reverse the action of such batteries but without any particular success. Reasons why it is desirable to be able to reverse the action of batteries of this class are that these batteries have one or more superior characteristics over the storage batteries now commercially used such as (1) a generally higher voltage per cell, (2) higher permissible charge-discharge rates per unit areas of the electrodes, (3) better efficiency of utilization of the active materials to give a higher capacity per units of volume and weight of the cells, and/or (4) a lower freezing point of the electrolyte of a discharged battery.

An example of a battery of the class mentioned which has been heretofore proposed as a storage battery is a nickel-zinc-alkaline type as disclosed in U. S. Patent No. 1,955,115 to James Joseph Drumm. This battery comprises an alkaline electrolyte such as caustic potash, a negative electrode of zinc on a support of nickel or iron plated with nickel, and a positive electrode of nickel or silver oxide mixed with a conductor of graphite or nickel flake and contained in nickeled steel pockets or tubes. The action of this battery during discharge, as with respect to the negative electrode, is that the zinc goes into solution to form a soluble compound known as potassium zincate. The theoretical reverse action is that during charging these zincate ions dissociate and form zinc ions, and these zinc ions are removed from solution and deposited as zinc metal on the negative electrode to restore the electrode to its original condition. However, in practice, the zinc has deposited as a loose, spongy and poorly adherent mass which has inferior properties as an active electrode material and a tendency to slough to the bottom of the cell into an inactive mass.

I have found methods of and apparatus for charging batteries which produce beneficial results as to batteries generally and which, in particular, enable the action of the batteries of the nickel-zinc-alkaline type and other batteries of the class described to be successfully reversed. This charging method consists in feeding an intermittent charging current to the battery and, during the interrupted periods, discharging a portion of each charge increment which has been fed to the battery during the preceding charge period. I find that generally the invention is carried out to the best advantage when the discharge currents have substantially higher value than the charge currents; also, particular advantages result when the discharge current is produced solely as a result of the energy stored in the battery.

These and other features of my invention will be apparent from the following description and the appended claims.

In the description of my invention reference is had to the acompanying drawings, of which:

Figure 1 is a diagrammatic view of circuits and apparatus illustrating one way of carrying out my invention;

Figure 2 is another diagrammatic view illustrating an alternative way of carrying out my invention; and Figure 3 is a graph illustrating the current and charge variations during the charging operation according to my invention.

In the method of carrying out my invention by the apparatus shown in Figure 1 the charging circuit is interrupted intermittently and the battery is connected across a load circuit during each interruption to cause a current to discharge from the battery in response solely to the accumulated energy stored in the battery. This charging apparatus may for example comprise a D. C. generator 10 having a drive shaft 11 driven by a suitable motor not shown and having positive and negative output terminals 12 and 13. The shaft 11 is coupled beyond the generator to a gear box 14 and leading from this box is a shaft 15 driven typically at a speed lower than that of the generator. This shaft 15 has mounted thereon two circuit interrupters 16 and 17 and a circuit closer 18. The interrupters 16 and 17 are identical and comprise disk-shaped insulating bodies 19 and 20 having slip rings 21 and 22 mounted on the peripheries of the bodies and extending throughout the axial lengths thereof. In the slip rings 21 and 22 there are recesses 23 and 24 in which there are insulating segments 25 and 26 flush with the outer surfaces of the rings and formed integrally with the bodies 19 and 20 respectively. The circuit closer 18 comprises a disk-shaped insulating body 27 having a slip ring 28 of a width equal to about half the axial length of the body 27. This ring is inset so that it is flush with the periphery of the body 27 and has a conducting segment 29 also inset in the body and extending therefrom throughout the axial length thereof. Both of the insulating segments 25 and 26 of the interrupters and the conducting segment 29 of the circuit closer are in line with one another along the shaft 15.

The positive terminal 12 of the generator is connected by a circuit 30 to a brush 31 which slidably engages the peripherally-continuous left half portion of the ring 21 of the interrupter 16, and in this circuit there is serially included an adjustable resistor 32 which is for controlling the value of the charge current as will hereinafter appear. Axially in line with the brush 31 is a brush 33 which slidably engages the segmental right half portion of the ring 21, it being in registration with the insulating segment 25 in the position of the interrupter shown in Figure 1. This brush 33 is connected by a circuit 34 to the positive side of a battery 35 to be charged. The negative side of this battery is connected by a circuit 36 to a brush 37 which registers with the segmental right half portion of the ring 22 of the interrupter 17, it being in contact with the insulating segment 26 in the position of the interrupter shown in Figure 1. Axially in line with this brush is a brush 38 which slidably engages the left half continuous portion of the ring 22. This brush is connected by a circuit 39 to the negative terminal 13 of the generator.

Furthermore there is a circuit 40 leading from the positive side of the battery to a brush 41 which registers with the right half portion of the interrupter 18, specifically with the conducting segment 29 when the interrupter is in the position shown in Figure 1. This circuit 40 serially includes a manual switch 42 and an adjustable resistor 43 which is for controlling the discharge current of the battery as will hereinafter appear. Axially in line with the brush 41 is a brush 44 slidably engaging the left half continuous portion of the ring 28. This brush is connected by a circuit 45 to the circuit 36 leading to the negative side of the battery.

The two interrupters 16 and 17 serve to break the charge circuit momentarily, once during each revolution of the shaft 15, and the circuit closer 18 serves to momentarily connect the resistor 43 across the battery during each interruption of the charge circuit. Typically, the insulating segments 25 and 26 and the associated brushes 33 and 37 may be so arranged as to break the charge circuit during approximately 1/30 of each revolution of the shaft 15 and the conducting segment 29 and associated brush 41 may be so arranged as to connect the discharge circuit across the battery during approximately 1/36 of each revolution of the shaft 15. By way of example, the speed of the shaft 15 may be approximately 60 R. P. M. Therefore, for the preferred illustrative values just mentioned, the charge circuit is closed during 29/30 of each second and the battery is on discharge during a remaining 1/36 of each second.

I find that when batteries of the type which have negative-electrode materials that go into solution during discharge are charged in the manner just described the dissolved active electrode materials deposit as dense and closely adherent masses to reverse completely the action of the battery on discharge. However, in order to maintain a successful reverse action until the battery is fully charged it is necessary to use a fairly high value of discharge current, typically much higher than a normal charge current, as the solution strength of the electrolyte decreases in terms of the dissolved electrode material. For example, with the nickel-zinc, alkaline type of battery, it is found that equal charge and discharge currents equivalent to approximately .0425 ampere per square centimeter of surface of the negative electrode will produce a dense metallic deposit of zinc on the negative electrode so long as the electrolyte contains of the order of 80 or more grams of dissolved zinc oxide per liter of solution, but that with such equal charge and discharge currents the zinc deposit becomes very loose and spongy as the solution strength of the electrolyte decreases below approximately 40 grams of zinc oxide per liter. However, if the discharge rate is doubled to approximately .09 ampere per square centimeter of surface of the negative electrode, the zinc will continue to deposit in a dense metallic form until the battery is fully charged. Since this higher rate of discharge has no detrimental effect during the first part of the charge period when the solution strength of the electrolyte is high, I preferably maintain the discharge rate at a value of approximately two and one-quarter times the charge rate during the whole charge operation. Thus, for the relative charge-discharge periods of 29/30 of a second and 1/36 of a second respectively, as aforementioned, and for relative charge and discharge currents of 1:2.25, about 6½% of the charge accumulated by the battery during each charge period is discharged during each successive discharge period.

Also, since suspended matter in the electrolyte solution may have a detrimental effect on the charging of the negative electrode, I preferably use positive electrodes which have been cleaned of matter that would tend to be thrown out into the electrolyte solution during use of the battery.

In Figure 3 there is an approximate graph 46 of the current (charge and discharge) vs. time, and also a second graph 47 of the accumulated charge vs. time. The charge current has a value 48 for a period 49, and the discharge current has a much greater value 50 for a relatively short succeeding period 51, the two periods 49 and 51 being the time of one complete cycle of the charging process. During each charge period 49 the accumulated charge, as in ampere hours, increases substantially uniformly, and during each discharge period 51 it decreases substantially uniformly. As a result, the charge curve 47 has zigzags 52 between successive charge periods.

Electrochemically the transformations which are believed to take place in the nickel-zinc-alkaline battery during charge and discharge are expressed approximately by the following equation:

$$Zn + 2KOH + Ni_2O_3 \leftrightarrows 2NiO + K_2ZnO_2 + H_2O$$

where the lefthand part of the equation represents the state of the active materials of the battery when the battery is charged and the righthand part represents that of the materials when the battery is discharged.

If during the initial part of a charge period, the battery is in a well-nigh completely discharged condition, the dissolved zinc is at first difficult to deposit on the electrode support. This difficulty appears to be augmented if the battery is intermittently discharged during the charging operation as in the manner above described. The explanation for this difficulty appears to be that during charge the zinc at first deposits very slowly and inefficiently on the electrode support, with the result that only a microscopic film is deposited during the first charge period 49. If then the battery is put on discharge during the succeeding period 51, even though this period is relatively short, the film of zinc deposit goes back into solution because the discharge action of the battery is relatively very efficient. Accordingly, during the first few seconds or minutes of a charge period, I preferably disable the discharge circuit by opening the switch 42.

There are advantages in producing the discharge currents solely by the accumulated charge of the battery—i. e., by simply connecting the battery across a resistive load 43 as shown in Figure 1—for in so doing there is avoided the need for critically controlling the discharge current to prevent possible complete removal of the deposited zinc film by the discharge currents during the initial part of the charge period. Thus, without critical control of the charging operation, effective continuation of the deposition of electrode material is assured during the critical stage of the charge period.

Since the load resistor 43 is out of the charge circuit, and the resistor 32 is out of the discharge circuit, these resistors constitute means for independently controlling the discharge and charge circuits respectively.

In Figure 2 there is shown an alternative charging apparatus which differs from the foregoing in that the discharge current flows in response to both the generator and battery voltages. Where components of this alternative embodiment are the same as in the foregoing embodiment, they are given the same reference characters. For instance, the positive terminal 12 of the generator 10 is connected through the resistor 32 by the circuit 30 to the brush 31 of the interrupter 16. The associated brush 33 is connected by the circuit 34 to the positive side of the battery 35. The negative side of the battery is connected by the circuit 36 to the brush 37 of the interrupter 17, and the associated brush 38 is connected by the circuit 39 to the negative terminal of the generator. Thus the charge circuit from the generator to the battery is interrupted momentarily once during each revolution of the shaft 15, the same as in the foregoing embodiment.

During each period of interruption of the charge circuit, the positive side of the battery 35 is connected by the circuit closer 18 to the negative terminal of the generator, and the positive terminal of the generator is connected through the resistor 32 and a second resistor 53 to one brush of a second circuit closer which is the same as the circuit closer 18 and is referred to as 18a. The second brush of this circuit closer 18a is connected through a switch 42 to the negative side of the battery. Thus, during discharge the battery and generator voltages are additive. However, the load during discharge constitutes both resistors 32 and 53. In this circuit, the resistor 53 provides a control for the discharge current without influence on the charge current, but the resistor 32 influences both the charge and discharge currents.

Another battery of the class mentioned which is made reversible by the present invention is one comprising a negative electrode of cadmium, a positive electrode of lead dioxide held in a lead alloy grid such as the positive electrode in the well-known lead-sulphuric acid storage battery, and an electrolyte of sulphuric acid of a density of approximately 1.25. The chemical reactions taking place in this battery on charge and discharge are expressed approximately by the following equation:

$$Cd + PbO_2 + 2H_2SO_4 \leftrightarrows CdSO_4 + PbSO_4 + 2H_2O$$

where the lefthand side of the equation represents the materials present when the battery is charged and the righthand side of the equation represents the materials present when the battery is discharged. The lead sulphate ($PbSO_4$), which is the reaction product of the positive electrode with the electrolyte, is an insoluble compound; however, the cadmium sulphate ($CdSO_4$), which is the reaction product of the negative electrode with the electrolyte, is a soluble compound and exists in a substantially wholly-dissolved state in the electrolyte.

This lead dioxide-cadmium-acid battery, like the nickel-zinc-alkaline battery, is not successfully reversible by continuous D.-C. charging current because with such current the cadmium which is taken out of solution is not restored on the negative electrode in the form of an adherent, smooth and dense deposit to effectively charge this electrode. However, by the charging method of my invention—which is to intermittently remove a portion of the cadmium deposit by momentarily discharging the battery at intervals during the charging process—the action of this battery is successfully reversed. I find however that the character of the cadmium deposit is improved when the discharge current is three to four times the charge current, but I do not intend any unnecessary limitation of my invention to these ratios of discharge to charge currents. Considerable latitude is also permissible in the relative time length of the discharge and charge periods. Preferably, this relative time length is set, for the current ratios just noted, so that the percentage energy discharged during each charge-discharge cycle is little more than that described in connection with the nickel-zinc-alkaline battery.

A common feature of the present charging methods as to all of the foregoing examples is that the current density in the electrodes is to be substantially higher—typically two or more times—during the discharge periods than during the charge periods in order to utilize my invention to greatest advantage. It is believed this is a general rule as to all batteries of the class described. Also it is believed to be a general rule as to all batteries of this class that a discharge during each discharge period of from 5% to 10% of the energy stored during each respectively preceding charge period is sufficient to realize the full advantages of the invention; however, it is to be noted that wider variations in these relative values are contemplated within the scope of the invention.

While many more examples of batteries of the class mentioned might be described, it is believed the foregoing illustrate my invention as to the various details thereof. As to the charging apparatus herein particularly described, it will be understood that many details thereof are merely illustrative and may be modified. The scope of my invention I endeavor to express according to the following claims.

I claim:

1. In a battery including a negative electrode having an active material which during discharge of the battery reacts electrochemically with the electrolyte to produce a soluble compound therein removable by electrolysis: the method of charging said battery to restore said active materials as a hard dense deposit on said negative electrode, comprising supplying said battery with intermittent charging current, and discharging said battery at a current substantially higher than said charging current between successive charging periods, said charging periods being sufficiently longer than the intervening discharge periods whereby said battery acquires an accumulative charge.

2. The method set forth in claim 1 wherein the discharge rate is at least several times greater than the charge rate and the lengths of the charge and discharge periods are such that approximately 5% to 10% of the charge increment of each charge period is discharged during each respectively succeeding discharge period.

3. The method of reversing the action of a battery having a liquid electrolyte and a negative-electrode material which react electrochemically with the electrolyte to produce a soluble compound that is removable from the electrolyte by electrolysis, which comprises first feeding uninterrupted charging current to the battery for a given length of time and thereafter feeding intermittent charging current to the battery and placing the battery on discharge during the interrupted periods.

4. The method of reversing the action of a battery having a liquid electrolyte and a negative electrode which reacts electrochemically with the electrolyte to produce a soluble compound that can be removed from the electrolyte by electrolysis, which comprises feeding intermittent charging current to the battery to store successive quantities of electrochemical energy therein, and discharging after each charge period a fraction of the quantity of energy stored in the battery during that period, the discharging current being substantially greater than said charging current.

5. The method of reversing the action of a battery having a liquid electrolyte and a negative electrode which reacts electrochemically with the electrolyte to produce a soluble compound that can be removed from the electrolyte by electrolysis, which comprises connecting said battery to a direct-current source to feed a charging current of a given value to the battery, and intermittently reversing the polarity of said source relative to that of said battery whereby said source and the accumulated energy in said battery produce a discharge current higher than said given value, said charge and discharge periods being so proportioned that a minor fraction of the energy stored during each charge is discharged during each succeeding discharge period.

ROBERT L. TICHENOR.

REFERENCES CITED

The following references are of record in the file of this patent:

UNITED STATES PATENTS

| Number | Name | Date |
|---|---|---|
| 726,468 | Scott | Apr. 28, 1903 |
| 942,279 | Perry | Dec. 7, 1909 |
| 1,126,667 | Wilson | Jan. 26, 1915 |
| 1,126,670 | Wilson | Jan. 26, 1915 |
| 1,132,986 | Turbayne | Mar. 23, 1915 |
| 1,362,844 | Cardoza | Dec. 21, 1920 |
| 1,955,115 | Drumm | Apr. 17, 1934 |

FOREIGN PATENTS

| Number | Country | Date |
|---|---|---|
| 144 | Great Britain | July 11, 1882 |
| 254,549 | Great Britain | July 8, 1926 |
| 391,458 | Great Britain | Apr. 28, 1933 |